US006428594B1

(12) United States Patent
Hintenlang et al.

(10) Patent No.: US 6,428,594 B1
(45) Date of Patent: Aug. 6, 2002

(54) FILTER CARTRIDGE MADE OF AN ACCORDION FOLD PACK FOLDED IN A ZIGZAG-SHAPED MANNER AND METHOD FOR ITS MANUFACTURE

(75) Inventors: Dieter Hintenlang, Abtsteinach; Richard Borris, Heddesheim, both of (DE)

(73) Assignee: Firma Carl Freudenberg, Weinheim (DE)

( * ) Notice: Subject to any disclaimer, the term of this patent is extended or adjusted under 35 U.S.C. 154(b) by 0 days.

(21) Appl. No.: 09/642,396

(22) Filed: Aug. 18, 2000

(30) Foreign Application Priority Data

Aug. 28, 1999 (DE) .......................... 199 41 029

(51) Int. Cl.$^7$ .............................................. B01D 46/52
(52) U.S. Cl. ........................ 55/498; 55/497; 55/511; 55/521; 210/493.3; 210/493.5; 156/251; 156/322; 156/515; 264/DIG. 48
(58) Field of Search .................... 55/497, 498, 502, 55/511, 521, DIG. 39; 210/493.3, 493.5; 264/DIG. 48; 156/251, 322, 497, 515

(56) References Cited

U.S. PATENT DOCUMENTS

| 3,596,828 | A | * | 8/1971 | Foster ........................ 383/94 |
| 4,070,222 | A | * | 1/1978 | Olson ........................ 156/251 |
| 5,089,202 | A | * | 2/1992 | Lippold ............... 264/DIG. 48 |
| 5,098,767 | A | * | 3/1992 | Linnersten ................... 55/521 |
| 5,174,896 | A | * | 12/1992 | Harms, II ................... 55/521 |
| 5,290,447 | A | * | 3/1994 | Lippold ...................... 55/521 |
| 5,531,892 | A | * | 7/1996 | Duffy ......................... 55/521 |
| 5,674,302 | A | * | 10/1997 | Nakayama et al. ......... 55/521 |
| 5,679,122 | A | * | 10/1997 | Moll et al. ................. 55/521 |
| 5,888,262 | A | * | 3/1999 | Kahler ........................ 55/521 |
| 6,036,752 | A | * | 3/2000 | Reuter ........................ 55/521 |
| 6,113,784 | A | * | 9/2000 | Stoyell et al. .............. 55/521 |

FOREIGN PATENT DOCUMENTS

| DE | 40 02 078 | 5/1991 |
| DE | 42 27 744 | 2/1994 |
| DE | 43 27 368 | 2/1995 |

\* cited by examiner

Primary Examiner—David A. Simmons
Assistant Examiner—Minh-Chau T. Pham
(74) Attorney, Agent, or Firm—Kenyon & Kenyon

(57) ABSTRACT

A filter cartridge made of an accordion fold pack folded in a zigzag-shaped manner and made of a thermoplastically moldable and heat-sealable material, whose folds are held at an adjusted, defined distance relative to each other, in particular made of a nonwoven fabric. The longitudinal direction of the accordion fold pack, transversely to the folds, the individual fold peaks are folded over in the same direction in at least one strip on one or both sides of the accordion fold pack and in each case fixedly joined to the next following, likewise turned-down fold at least in the overlapping region, by heat-sealing.

5 Claims, 7 Drawing Sheets

FILTER CARTRIDGE MADE OF AN ACCORDION FOLD PACK FOLDED IN A ZIGZAG-SHAPED MANNER AND METHOD FOR ITS MANUFACTURE

BACKGROUND OF THE INVENTION

The present invention relates to the improvement of filter cartridges made of an accordion fold pack folded in a zigzag-shaped manner that are made of a thermoplastically moldable and heat-sealable material. In filter cartridges of this type, the folds are held at an adjusted, defined distance relative to each other, and are made of a nonwoven fabric. Filter cartridges of this kind are used, for example, in vehicles to filter the passenger compartment air or also as an engine supply air filter. A recurring problem in these filters is the difficulty of providing regular fold spacing and consequently an unvarying, uniformly good filtering action across the entire filter surface. During the installation of the filter or during use, the fold spacings can be changed unintentionally, resulting in a reduced filter action.

The use of prefabricated strips as fixing or positioning means for stabilizing the folds is described in German patent DE OS 42 27 744, in which the strips are joined to the fold edges of the filter material by fusing the strip or the filter sheet material. To build such a filter pack, the filter sheet material folded in a zigzag-shaped manner is inserted into a comb-like holder device, the strips to be applied for stabilizing the fold configuration are put on the fold edges, and the strips are heat-sealed onto the fold edges. In this connection, the placing of the additional strips and heat-sealing the strips to the filter sheet material constitute a disadvantage.

Another way for maintaining the fold spacings in a predefined position can be gathered from German patent DE PS 40 02 078. A filter cartridge designed as an accordion fold pack and made of thermoplastically heat-sealable nonwoven fabric is manufactured with a defined fold spacing. Then, the two outer edges of the accordion fold pack are clamped positively between corresponding, comb-like profiles, and a material laterally projecting over the end edges of the folds is initially folded over and then thermally heat-sealed together. The method is relatively easy to handle and provides good results. Due to the folds heat-sealed at the end edges over their whole height, however, the accordion fold pack gets a stiffness which can restrict its range of application.

A different design approach is pursued in a filter according to German patent DE OS 43 27 368, where supporting elements are inserted into the filter element on one side for fixing the fold spacing in position. The supporting elements are made of flexible plastic and allow the filter element to warp about its longitudinal axis. However, relatively great outlay is required for manufacturing the supporting element and for inserting it into a filter element so that the filter element can be used only conditionally if only for cost reasons.

The object of the present invention is to devise a filter cartridge which can be manufactured in an inexpensive and uncomplicated manner and whose flexibility or stiffness can be predefined. In this context, it is desirable that the spacings of the individual folds of the accordion fold pack always be adjustable and defined. The method required for its manufacture shall be easy to handle and shall not require great outlay for machinery.

SUMMARY OF THE INVENTION

The present invention attains these objectives. To manufacture the filter cartridge, in the case of an accordion fold pack folded in a zigzag-shaped manner, the fold peaks are interconnected in a strip-shaped manner in the longitudinal direction of the accordion fold pack transversely to the folds. Within the strip, the individual fold peaks are turned down in the same direction and in each case fixedly (permanently) joined to the next following, likewise turned-down fold at least in the overlapping region. In such a filter cartridge, the distances of the folds relative to each other are defined since all fold peaks are turned down at the same height. Depending on the size of the filter and also as a function of other dimensions of the filter material, the filter surface is provided with only one strip on only one side or also with several strips on only one or both sides of the accordion fold pack. If the accordion fold pack is provided with connecting strips on only one side of the accordion fold pack, the accordion fold pack retains a high flexibility. By strips on both sides of the accordion fold pack, a higher stiffness of the accordion fold pack is achieved.

In principle, it is possible for the turned-down fold peaks to be secured to the next fold in the overlapping region by a bonding process. For this, however, corresponding application means for the bonding compound are required. Therefore, it is more convenient for the filter cartridge to be manufactured from a nonwoven fabric which is composed of a thermoplastically moldable and heat-sealable material. The individual fold peaks can then be joined to the next following fold in the overlapping region by heat-sealing.

In particular in the case of small filters, it is sufficient to attach a strip on only one side of the accordion fold pack, for example, in its central region. In some fields of application of the filter cartridge, this is already sufficient. However, a higher stability is achieved if strips are attached, for example, at each end face of the accordion fold pack, the strips possibly being supplemented additionally by strips in the middle of the accordion fold pack. The attachment in the middle of the accordion fold pack can also be carried out on the opposite side of the accordion fold pack so that the strips are attached on mutually opposing sides. In this manner, the accordion fold pack gets a higher stiffness.

One shape that is favorable for many applications is formed if the strips exist on both sides of the accordion fold pack sack, preferably at its end edges, in a manner that they coincide with one another. Then, a filter cartridge is formed whose longitudinal edges can be used as guide bar, sealing frame, or clamping rim for securing the filter cartridge to a housing.

For manufacturing the filter cartridge, the accordion fold pack is put on a comb-shaped holding device. The teeth of the holding device are shortened by the length of the fold peaks that is capable of being turned-down and mesh with the individual folds. The width of each tooth row is aligned with the width of the respective strip. A heat-sealing tool having one or a plurality of bars, likewise in the width of the individual strips is used for folding over and heat-sealing the fold peaks. In this context, the fold peaks are turned down in the same direction and then heat-sealed together.

BRIEF DESCRIPTION OF THE DRAWINGS

Several exemplary embodiments of the present invention are shown in the drawings.

DETAILED DESCRIPTION OF THE INVENTION

Figure 1:
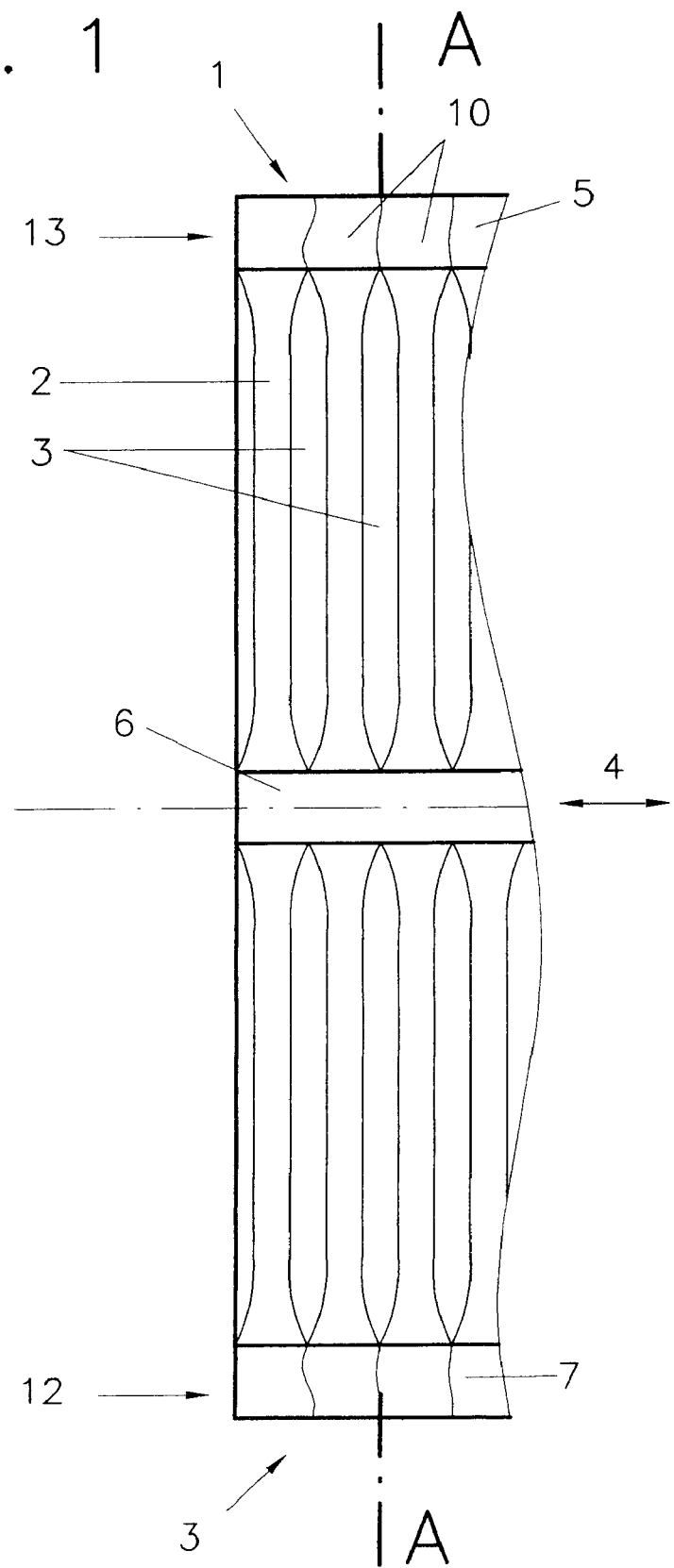
FIG. 1 shows a top view of a portion of a filter cartridge constructed according to an embodiment of the invention.

FIG. 1 shows a top view of a filter cartridge 1 which is composed of an accordion fold pack 2 folded in a zigzag-shaped manner and made of nonwoven fabric. Individual folds 3 are at uniform distances relative to each other. Accordion fold pack 2 is provided with strips 5, 6, and 7 in the longitudinal direction 4. Attached at end edges 12, 13 of folds 3 are strips 5 and 7. Additionally, provision is made for strip 6 in the middle of accordion fold pack 2. Accordion fold pack 2 is of finite length (in the Figure, only one side end is shown).

Figure 2:
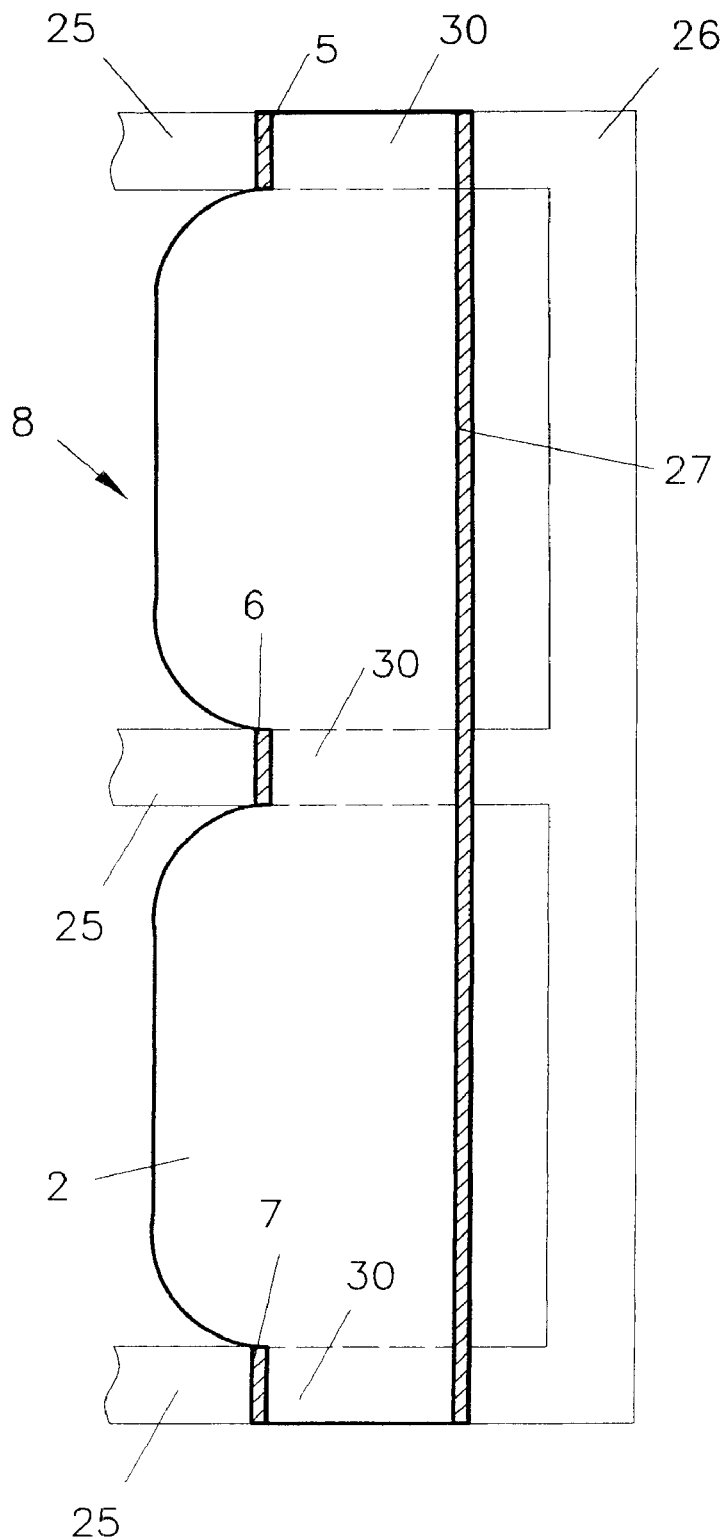
FIG. 2 shows a section taken through the filter cartridge of FIG. 1 according to line A—A.

FIG. 2 shows a section taken through the bellows of FIG. 1 along line A—A. In the section, it can be seen that strips 5 through 7 are attached only on upper side 8 of accordion fold pack 2. Strips 5 through 7 are attained by folding over individual fold peaks 10 and joining turned-down fold peaks 10 in overlapping region 20 (see FIG. 6), it being also possible for both legs 11 of fold peaks 10 to be joined to one another. In this manner, strips 5 through 7 are formed. Fold peaks 10 can be turned down and joined to one another by a sonotrode 25 using the ultrasonic heat-sealing method. In this case, sonotrode 25 is equipped with anvil 26 which meshes with accordion fold pack 2 from below with three tooth rows 30 designed in a comb-shaped manner (see FIG. 6).

In the simplest embodiment in the case of small filters, it is sufficient for accordion fold pack 2 to be provided with strip 6 in its middle only on one of its sides 8. However, an improved allocation of individual folds 3 relative to each other is achieved if strips 5 and 7 are attached at each end edge 12, 13 of accordion fold pack 2. In the case of particularly wide accordion fold packs 2, strips 5 through 7 can be attached at end edge 12, 13 and also in the middle of accordion fold pack 2.

In an embodiment as is shown in FIGS. 1 and 2, accordion fold pack 2 retains a high flexibility and can, for example, be easily brought into a cylindrical form. In this context, side 8 with strips 5 through 7 can come to rest both outside or also preferably inside the cylinder.

Figure 3:
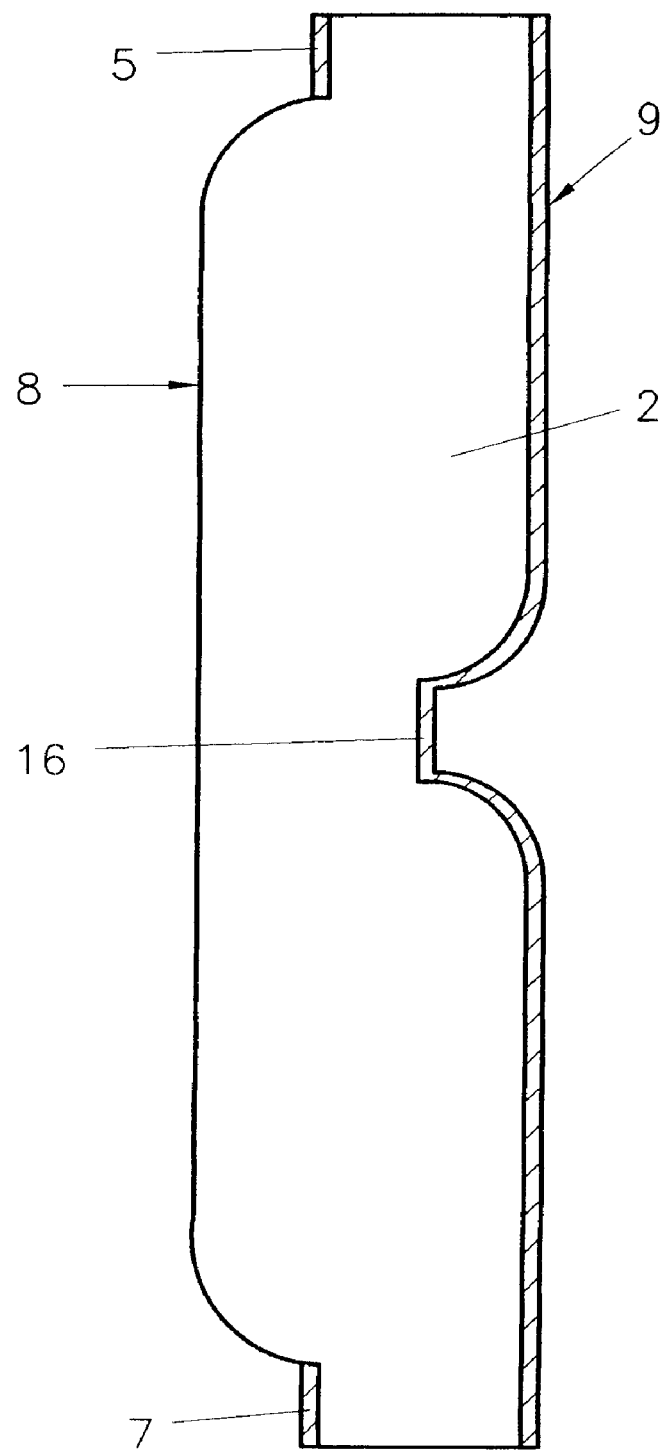
FIG. 3 shows a section through a filter cartridge having mutually opposing strips.

FIG. 3 also shows a section through a filter pack 2 similar to FIG. 2 with the difference, however, that middle strip 16 is attached on side 9, opposite of side 8. In this manner, the accordion fold pack attains a higher stiffness.

Figure 4:
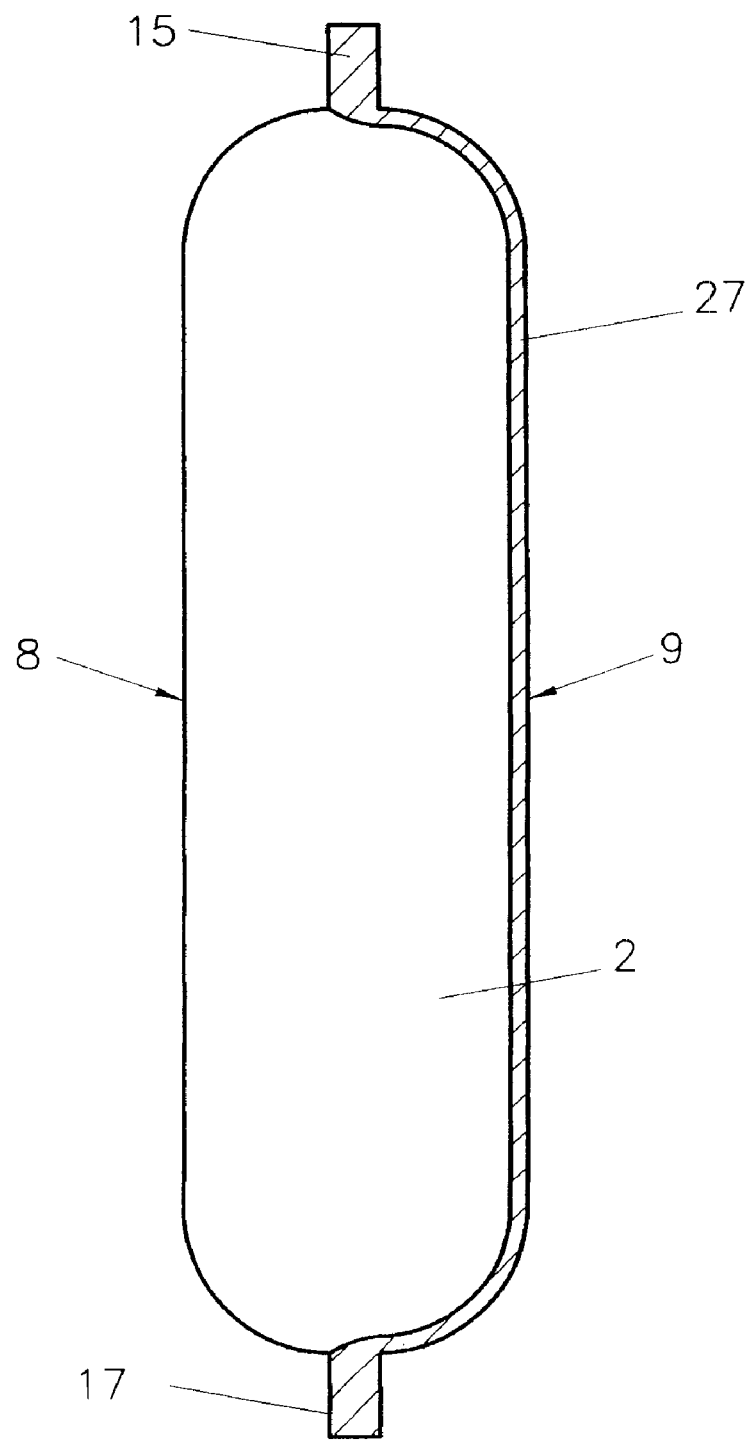
FIG. 4 shows a section of a filter cartridge having connecting strips on both of its sides.

FIG. 4 shows a section through an accordion fold pack 2 where strips 15 and 17 are formed by folding over coinciding fold peaks 10 on both sides 8 and 9 of accordion fold pack 2. In this context, strips 15 and 17 result in two lateral bars which can be used as guide bars or sealing bars when inserting accordion fold pack 2 into a frame or another device.

Figure 5:
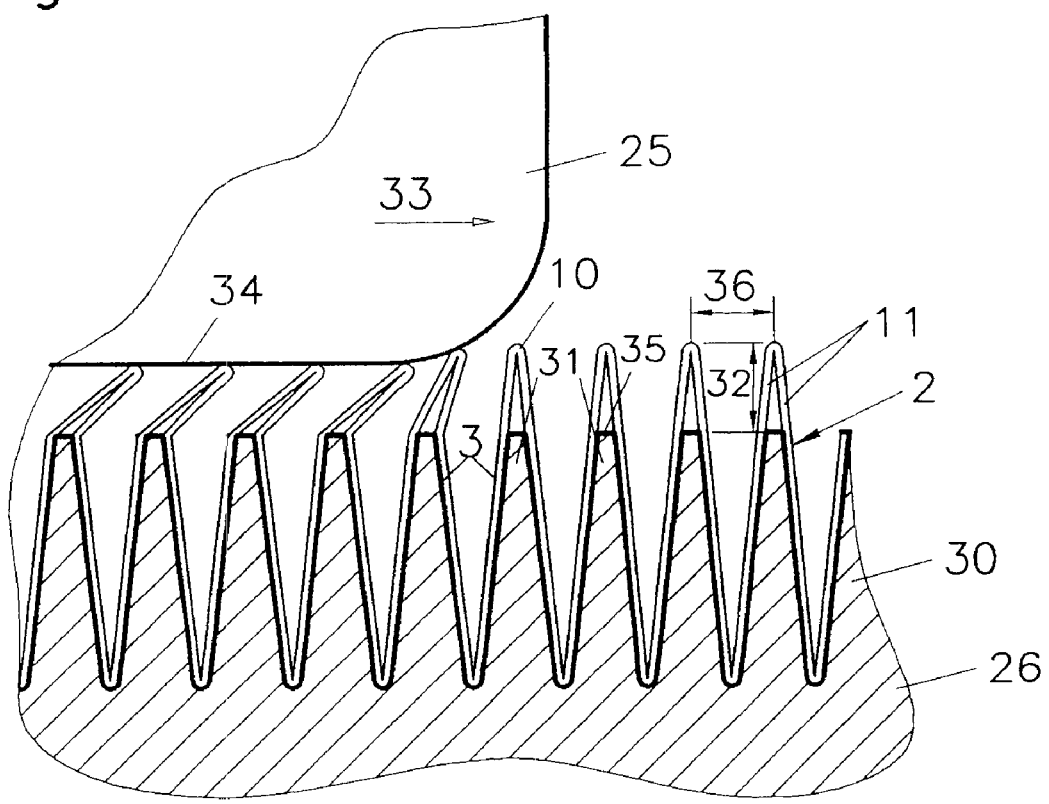
FIG. 5 shows the manufacture of the connecting strip by folding over the fold peaks.
Figure 6:
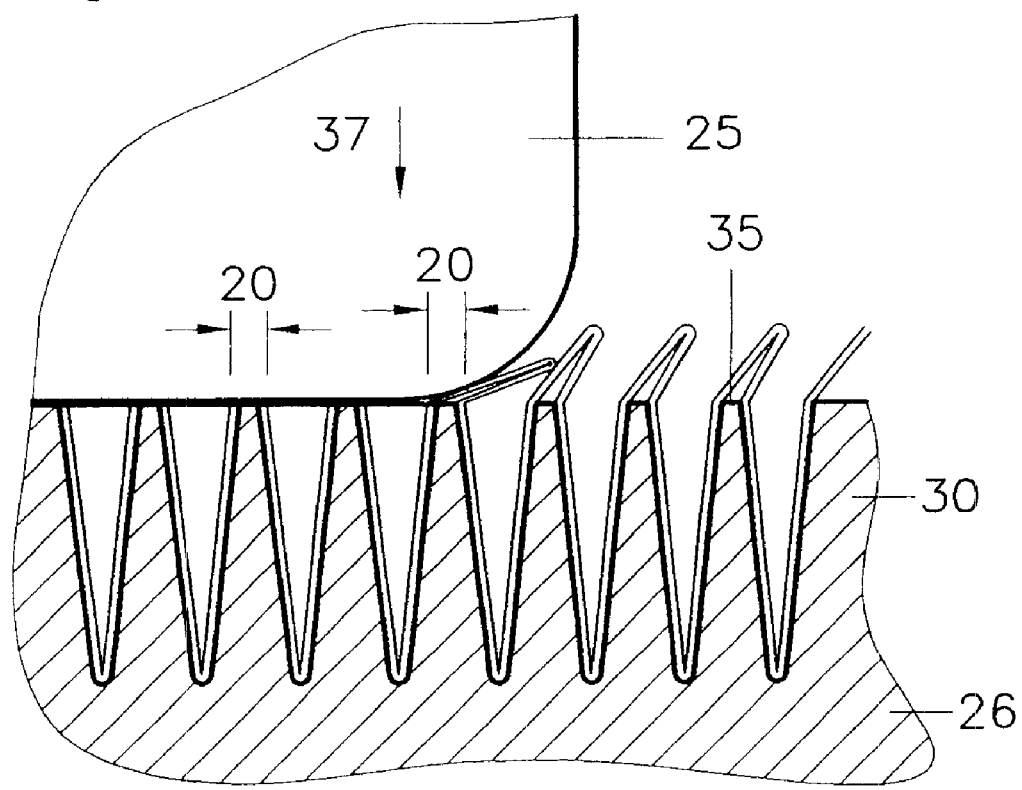
FIG. 6 shows the heat-sealing of the overlapping regions of fold peak and next following fold.

FIGS. 5 and 6 show a schematic representation of the process for manufacturing filter cartridge 1. As shown in FIG. 5, accordion fold pack 2 is initially inserted into a device (not shown in greater detail) having a comb-shaped holding device 26. For each strip 5 through 7, or 16, provision is made for a tooth row 30. The teeth of holding device 26 mesh with the clearances of individual folds 3 from below. Sonotrode 25 is moved transversely to individual folds 3 in the direction of arrow 33. The distance of lower edge 34 of sonotrode 25 is selected such that peaks 10 of folds 3 are turned down by sonotrode 25. The individual teeth of the comb are shortened so that they do not project into fold peaks 10 themselves. Tooth top edge 35 is consequently used as abutment during the folding over of fold peaks 10. Length 32 of fold peaks 10 that is capable of being turned down is selected such that fold peaks 10 bridge clearances 36 between individual folds 3 and in each case abut against the next fold.

After fold peaks 10 have been turned down partially by sonotrode 25 as shown in FIG. 5, sonotrode 25 is moved downward as shown by arrow 37 in FIG. 6, and the heat-sealing operation is carried out. Formed in the process are strips as are shown in FIGS. 1 through 3. In the region as strips 5 through 7, individual peaks 10 are fixedly joined to the, in each case, next following fold peak 10 in overlapping region 20. Overlapping region 20 extends over tooth edge 35. By adjusting sonotrode 25 appropriately, legs 11 of fold peaks 10 can also be heat-sealed together so that a welded seam is formed at the strip.

Figure 7:
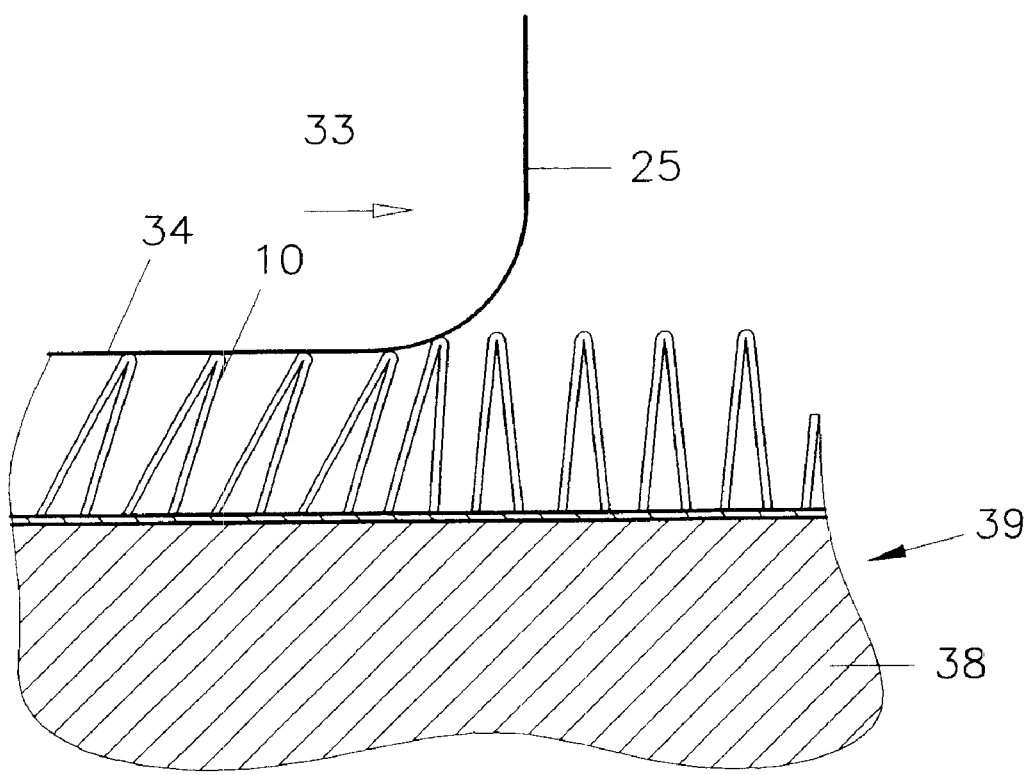
FIG. 7 shows the heat-sealing operation with counterbar.

The manufacture of strips 15 and 17, as is shown in FIG. 4, is carried out in the first step as described in FIGS. 5 and 6. Initially, fold peaks 10 are turned down on one of sides 8 or 9 of accordion fold pack 2 and heat-sealed together. Then, fold pack 2 is put on a further holding device 39 which is provided with continuous bars 38 in lieu of tooth rows 30, as shown in FIG. 7. Thereupon, fold peaks 10 are turned down and heat-sealed together in a strip which coincides with the strip already formed on the one side of fold pack 2. The folding-over operation is shown in FIG. 7. For heat-sealing, sonotrode 25 is pressed down on bars 38.

What is claimed is:

1. A filter cartridge comprising:

an accordion fold pack folded in a zigzag-shaped manner and made of a thermoplastically moldable and heat-sealable material, wherein individual folds have peaks and are made of a nonwoven material and are held at an adjusted, defined distance relative to each other, and wherein the accordion fold pack has a longitudinal direction along which and transversely to the folds, the individual fold peaks are turned-down in the same direction in at least one strip on at least one side of the accordion fold pack and in each case is fixedly joined to the next, likewise turned-down fold, at least in an overlapping region, by heat-sealing.

2. The filter cartridge as recited in claim 1, wherein a strip is arranged in the middle on one side of the accordion fold pack.

3. The filter cartridge as recited in claim 1, wherein strips are attached at each end edge of the accordion fold pack.

4. The filter cartridge as recited in claim 1, wherein strips are attached at the end edges and in the middle of the accordion fold pack.

5. The filter cartridge as recited in claim 1, wherein strips are on opposite sides of the accordion fold pack, and preferably at end edges, in a manner that they coincide with one another.

* * * * *